(12) United States Patent
Rixen et al.

(10) Patent No.: US 9,669,449 B2
(45) Date of Patent: Jun. 6, 2017

(54) METHOD FOR PRODUCING A THROUGH HOLE IN A METALLIC BODY

(71) Applicants: Wolfgang Rixen, Solingen (DE); Gerrit Pies, Solingen (DE)

(72) Inventors: Wolfgang Rixen, Solingen (DE); Gerrit Pies, Solingen (DE); Tobias Geisler, Solingen (DE)

(73) Assignees: Wolfgang Rixen, Solingen (DE); Gerrit Pies, Solingen (DE)

( * ) Notice: Subject to any disclaimer, the term of this patent is extended or adjusted under 35 U.S.C. 154(b) by 0 days.

(21) Appl. No.: 14/765,850

(22) PCT Filed: Jan. 25, 2014

(86) PCT No.: PCT/EP2014/000195
§ 371 (c)(1),
(2) Date: Aug. 5, 2015

(87) PCT Pub. No.: WO2014/121898
PCT Pub. Date: Aug. 14, 2014

(65) Prior Publication Data
US 2015/0367399 A1    Dec. 24, 2015

(30) Foreign Application Priority Data

Feb. 5, 2013  (DE) .......................... 10 2013 001 919

(51) Int. Cl.
*B21D 28/24*    (2006.01)
*B21K 1/70*     (2006.01)
*F16B 37/04*    (2006.01)

(52) U.S. Cl.
CPC .............. *B21D 28/243* (2013.01); *B21K 1/70* (2013.01); *F16B 37/045* (2013.01); *Y10T 83/04* (2015.04)

(58) Field of Classification Search
CPC ....... B21D 28/243; B21D 28/32; B21D 28/24; B21K 1/70; Y10T 83/04
See application file for complete search history.

(56) References Cited

U.S. PATENT DOCUMENTS

2013/0220049 A1    8/2013   Werner et al.

FOREIGN PATENT DOCUMENTS

| DE | 197 53 069 A1 | 6/1999 |
|----|---------------|--------|
| DE | 10 2010 007 955 A1 | 8/2011 |
| GB | 493 338 A | 10/1938 |

OTHER PUBLICATIONS

Lazzarotto L et al.: Adiabatic blanking of metal sheets: Technological postioning and industrial developments for production; 5th Car Body Colloqium; Nov. 1, 2008 (Nov. 1, 2008)—see international search report.

*Primary Examiner* — Teresa M Ekiert
(74) *Attorney, Agent, or Firm* — Gudrun E. Huckett

(57) ABSTRACT

The invention relates to a method for producing g a through-hole (10) in a metallic body (12), which has at least one curved surface, by means of a reciprocating movement, said through-hole (10) being produced by means of high speed shearing cutting (HGSS).

9 Claims, 1 Drawing Sheet

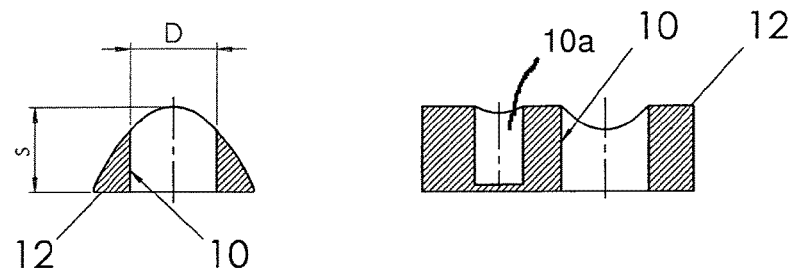
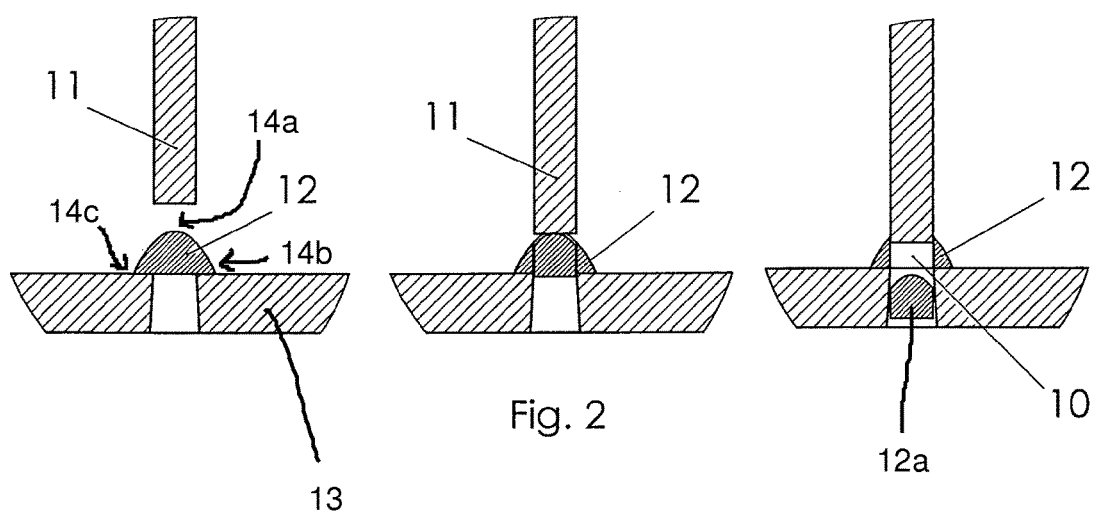
Fig. 1
Fig. 2

METHOD FOR PRODUCING A THROUGH HOLE IN A METALLIC BODY

BACKGROUND OF THE INVENTION

The invention concerns a method for producing, by means of a stroke movement, a through hole in a metallic body that comprises at least one curved surface.

A method for adiabatic cutting of workpieces by means of high-speed impact cutting (HSIC) is disclosed in DE 103 17 185 A1.

This publication discloses a method for producing profiled parts by cutting from profiled rods. In this context, the profiled rod is clamped in a tool between two active parts wherein the facing support side of the active parts are in the form of dies in which the shape of the profiled section to be processed is cut out, respectively. Moreover, the sizes of the support sides have the dimensions of the profiled part to be cut. Finally, cutting is carried out adiabatically at a very high impact speed of the cutting die wherein the force is introduced by means of the plunger onto the active part.

The method described therein is used for cutting to length a plurality of aforementioned profiled sections (see paragraph 6 of DE 103 17 185).

This concerns exclusively cutting of profiled sections in which no bores are provided. In particular, no through holes are provided.

According to paragraph 31 of the aforementioned publication, cutting or pressing in general is performed at a speed in the range of 0.5 to 20 m/s, preferably in the range of 10 to 40 m/s, and in particular preferred in the range of 10 to 20 m/s, wherein according to this publication an adiabatic state is reached beginning at 10 m/s.

This is described in the aforementioned publication only for flat workpiece geometries.

DE 103 17 185 discloses that the described high-speed stamping of flat sheet metals focuses also on sheet metals and not on profiled sections which can be cut with the disclosed method.

Not described in this publication is however the generation of through holes for materials with a great curvature.

This is carried out momentarily only by means of drilling which requires, in regard to mass production, a relatively long processing time and also is subject to increased wear. Also, cuttings are generated thereby which are disruptive in production and, moreover, must be removed carefully by means of the cooling lubricant.

The invention has therefore the object to improve the method of the aforementioned kind in such a way that the metallic bodies can be produced with highest precision and also with a significantly increased speed.

SUMMARY OF THE INVENTION

This object is solved for a method of the aforementioned kind in that the through hole is realized by means of high-speed impact cutting (HSIC).

The gist of the invention resides in generating, even for curved metallic pieces, an adiabatic state by means of a stroke movement that is adjustable so precisely that no or hardly any post-processing is required.

Moreover, it can be provided that punching also can be realized beginning at the curved surface.

According to a further embodiment of the invention, it is provided that the high-speed impact cutting (HSIC) is carried out with a ratio of hole diameter D to a metal thickness s of smaller than 1.5.

In this context, it has been found that, depending on the material, an adiabatic state can be generated also for stroke movement speeds of less than 10 m/s.

This is in contrast to the statement of the aforementioned publication.

Particularly advantageous is in this context when the stroke movement speed is 6 m/s up to 8 m/s, preferably 7 m/s.

Since this through hole preferably is to serve as a screw hole, it is advantageous when the through hole is provided with an inner thread.

According to a further embodiment of the invention, it is provided that the cross-section of the metallic body is triangular, comprises at least one rounded corner, and the through hole is extending from the at least one curved corner transversely to the connecting line of the two other corners.

This novel method according to the invention for producing through holes can be used in a variety of ways in connection with raised or curved materials.

Particularly advantageous is when this method is used for producing sliding blocks.

In this context, it is advantageous when additionally the sliding block also is provided with a blind bore in accordance with one of the methods for producing blind bores according to the simultaneously filed and pending patent application (filed on Feb. 5, 2013). Into this blind bore, later on a spring-loaded ball is placed which is of course swedged at the inlet rim so that it can be secured within the blind bore.

BRIEF DESCRIPTION OF THE DRAWINGS

Further advantages and features of the invention result from the following description of an embodiment as well as from the drawings to which reference is being had. It is expressly noted that the description is based on the manufacture of a sliding block but is not limited in any way to this embodiment. It is shown in:

FIG. 1 two cross-sections of a sliding block provided with a through hole; and

FIG. 2 a sequence schematic for producing the through hole as well as a further final machining for a sliding block with blind bore.

DESCRIPTION OF THE PREFERRED EMBODIMENTS

With the aid of FIGS. 1 and 2, the manufacture or the method for producing a through hole 10 within, in this case, a metallic sliding block 12 that naturally has a curved surface will now be explained. It is again noted that the description of a sliding block is only an example because this method according to the invention can of course also be used for other metallic bodies with curved surfaces.

As can be seen schematically in the illustration of FIG. 2, this through hole 10 is produced by means of a stroke movement of a plunger 11 wherein in this context high speed impact cutting (HSIC) is used, beginning at the highest projecting point 14a of the curved surface of the sliding block 12 resting on die 13. The cross-section of the metallic body 12 is essentially triangular and comprises at least one rounded corner 14a. The through bore 10 extends from the at least one rounded corner 14a transversely to the connecting line of the two other corners, 14b, 14c.

The stamped-out material 12a is then subsequently fed to a collecting site.

The through hole 10 can have a hole diameter D of 6.9 mm to 7.5 mm and likewise a material thickness s of 6.9 mm up to 7.5 mm.

With this method, for a material thickness s of 7.3 mm a hole diameter D of 7.4 mm was produced.

This is a ratio D/s for adiabatic production of approximately 1.

In the described embodiment, a stroke speed of less than 10 m/s, preferably of 7 m/s, was used.

Since the through hole for a sliding block 12 of course serves to receive a screw thread, this through hole 10 is also provided with an inner thread.

Since the sliding block 12 for comfortable assembly may also be provided with a spring-loaded ball at the site of highest bulge, it is of course also possible to provide this sliding block with a so-called blind bore 10a (FIG. 1). This also is performed with a method producing an adiabatic state as set forth in the simultaneously filed and pending patent application by the same applicant filed on Feb. 5, 2013 DE 10 2013 001 918.4).

By means of the method according to the invention, it is now possible to provide in a much shorter period of time a metallic workpiece or a sliding block with a through hole.

What is claimed is:

1. A method for producing a through hole in a metallic body, the method comprising:
    placing the metallic body that comprises a triangular cross-section with three corners, wherein at least one of the three corners is a rounded corner and wherein a material thickness of the metallic body is measured from a connecting line of the two corners opposite said rounded corner to a tip of said rounded corner, onto a die;
    carrying out a stroke movement with a plunger by high-speed impact cutting (HSIC) to cut adiabatically the through hole with a hole diameter through the metallic body from said rounded corner transversely to the connecting line of the two corners with a ratio of the hole diameter relative to the material thickness of equal to or greater than 0.92 and less than 1.5.

2. The method according to claim 1, further comprising selecting the material thickness of the metallic body to be 6.9 mm to 7.5 mm and selecting the hole diameter of the through hole to be 6.9 mm to 7.5 mm.

3. The method according to claim 1, wherein an adiabatic state is generated even for stroke movement speeds of less than 10 m/s.

4. The method according to claim 3, further comprising selecting the stroke movement speed to be 6 m/s to 8 m/s.

5. The method according to claim 4, wherein the stroke movement speed is 7 m/s.

6. The method according to claim 1, further comprising producing an inner thread within the through hole.

7. The method according to claim 1, wherein the metallic body is a sliding block.

8. The method according to claim 7, further comprising producing a blind bore in the sliding block.

9. A method for producing a through hole in a metallic body, the method comprising:
    placing the metallic body that comprises a triangular cross-section with three corners, wherein at least one of the three corners is a rounded corner and wherein a material thickness of the metallic body is measured from a connecting line of the two corners opposite said rounded corner to a tip of said rounded corner, onto a die;
    carrying out a stroke movement with a plunger by high-speed impact cutting (HSIC) to cut adiabatically the through hole with a hole diameter through the metallic body from said rounded corner transversely to the connecting line of the two corners with a ratio of the hole diameter relative to the material thickness of less than 1.5.

\* \* \* \* \*